US008867459B2

(12) United States Patent
Tujkovic et al.

(10) Patent No.: US 8,867,459 B2
(45) Date of Patent: Oct. 21, 2014

(54) MOBILE SUBSCRIBER INFORMATION TRANSMISSION OVER MULTIPLE UPLINK FRAMES

(75) Inventors: Djordje Tujkovic, Santa Clara, CA (US); Louay Jalloul, Santa Clara, CA (US); Bertrand Hochwald, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 758 days.

(21) Appl. No.: 12/837,400

(22) Filed: Jul. 15, 2010

(65) Prior Publication Data

US 2011/0216716 A1    Sep. 8, 2011

Related U.S. Application Data

(60) Provisional application No. 61/311,766, filed on Mar. 8, 2010, provisional application No. 61/315,276, filed on Mar. 18, 2010.

(51) Int. Cl.
| H04W 4/00 | (2009.01) |
| H04L 5/00 | (2006.01) |
| H04W 72/04 | (2009.01) |
| H01Q 3/26 | (2006.01) |
| H04W 28/06 | (2009.01) |
| H04W 76/02 | (2009.01) |

(52) U.S. Cl.
CPC .............. *H04L 5/003* (2013.01); *H04W 72/04* (2013.01); *H01Q 3/2682* (2013.01); *H04L 5/0007* (2013.01); *H04W 28/065* (2013.01); *H04W 76/02* (2013.01)
USPC ............................ 370/329; 370/338; 455/450

(58) Field of Classification Search
None
See application file for complete search history.

(56) References Cited

U.S. PATENT DOCUMENTS

| 2002/0080719 A1 | 6/2002 | Parkvall et al. |
| 2003/0050074 A1 | 3/2003 | Kogiantis et al. |
| 2007/0140167 A1 | 6/2007 | Jang et al. |
| 2007/0248045 A1 | 10/2007 | Nagaraj |
| 2007/0253473 A1 | 11/2007 | Ishii et al. |
| 2008/0285511 A1 | 11/2008 | Puri et al. |
| 2009/0092067 A1 | 4/2009 | Sudarshan et al. |
| 2009/0141696 A1 | 6/2009 | Chou et al. |
| 2009/0202013 A1 | 8/2009 | Sebastian |
| 2009/0207762 A1 | 8/2009 | Jalloul et al. |

(Continued)

FOREIGN PATENT DOCUMENTS

| WO | WO 2011/112639 A1 | 9/2011 |
| WS | 101132201 A | 2/2008 |

OTHER PUBLICATIONS

International Search Report for International Application No. PCT/US2011/027623, United States Patent and Trademark Office, United States, mailed on Jun. 1, 2011.

(Continued)

*Primary Examiner* — Marcus R Smith
(74) *Attorney, Agent, or Firm* — Sterne, Kessler, Goldstein & Fox P.L.L.C.

(57) ABSTRACT

Methods and apparatuses of a mobile subscriber transmitting information to a base station are disclosed. One method includes identifying an uplink transmission condition. If the uplink transmission condition is identified, the mobile subscriber transmits a message over multiple uplink frames. The mobile subscriber informs the base station that it is transmitting the message over the multiple uplink frames.

21 Claims, 8 Drawing Sheets

(56) References Cited

U.S. PATENT DOCUMENTS

| | | |
|---|---|---|
| 2010/0189056 A1 | 7/2010 | Nishibayashi et al. |
| 2010/0226327 A1* | 9/2010 | Zhang et al. ............... 370/329 |
| 2010/0246518 A1* | 9/2010 | Gheorghiu et al. .......... 370/329 |
| 2011/0110257 A1* | 5/2011 | Kim et al. ................... 370/252 |
| 2011/0110322 A1* | 5/2011 | Koyanagi et al. ........... 370/329 |
| 2011/0141981 A1 | 6/2011 | Ahmadi et al. |
| 2012/0002568 A1* | 1/2012 | Tiirola et al. ............... 370/252 |
| 2012/0057477 A1 | 3/2012 | Jalloul et al. |

OTHER PUBLICATIONS

Office Action directed to related Chinese Patent Application No. 201180013034.9, mailed Sep. 3, 2014; 6 pages.

English-lanaguage abstract of Chinese Patent Application Publication No. 101132201 A; 1 page.

* cited by examiner

US 8,867,459 B2

MOBILE SUBSCRIBER INFORMATION TRANSMISSION OVER MULTIPLE UPLINK FRAMES

RELATED APPLICATIONS

This patent application claims priority to U.S. provisional patent application Ser. No. 61/311,766 filed on Mar. 8, 2010, and to U.S. provisional patent application Ser. No. 61/315,276 filed on Mar. 18, 2010, which are incorporated by reference.

FIELD OF THE DESCRIBED EMBODIMENTS

The described embodiments relate generally to wireless communication. More particularly, the described embodiments relate to methods and systems for mobile subscriber uplink transmission over multiple transmission frames.

BACKGROUND

Wireless communication systems are widely deployed to provide various types of communication content such as voice and data. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, Worldwide Interoperability for Microwave Access (WiMAX), and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

It is desirable to improve the quality of uplink transmission of a wireless multiple-access communication system.

SUMMARY

An embodiment includes a method of a mobile subscriber transmitting information to a base station. The method includes identifying an uplink transmission condition. If the uplink transmission condition is identified, the mobile subscriber transmits a message over multiple uplink frames. The mobile subscriber informs the base station that it is transmitting the message over the multiple uplink frames.

Another embodiment includes another method of a wireless system controlling uplink transmitting of information from a mobile station to a base station. The method includes at least one of the base station and the mobile subscriber identifying an uplink transmission condition. If the uplink transmission condition is identified, the mobile subscriber transmits a message over multiple uplink frames. Additionally, if the uplink transmission condition is identified, the mobile unit transmits the message over different sets of subcarriers for at least two of the multiple frames. The mobile subscriber informs the base station that it is transmitting the message over multiple uplink frames.

Another embodiment includes a mobile subscriber. The mobile subscriber includes a means for identifying an uplink transmission condition. If the uplink transmission condition is identified, the mobile subscriber transmits a message over multiple uplink frames. The mobile subscriber informs the base station that it is transmitting the message over multiple uplink frames.

Other aspects and advantages of the described embodiments will become apparent from the following detailed description, taken in conjunction with the accompanying drawings, illustrating by way of example the principles of the described embodiments.

DETAILED DESCRIPTION

Figure 1:
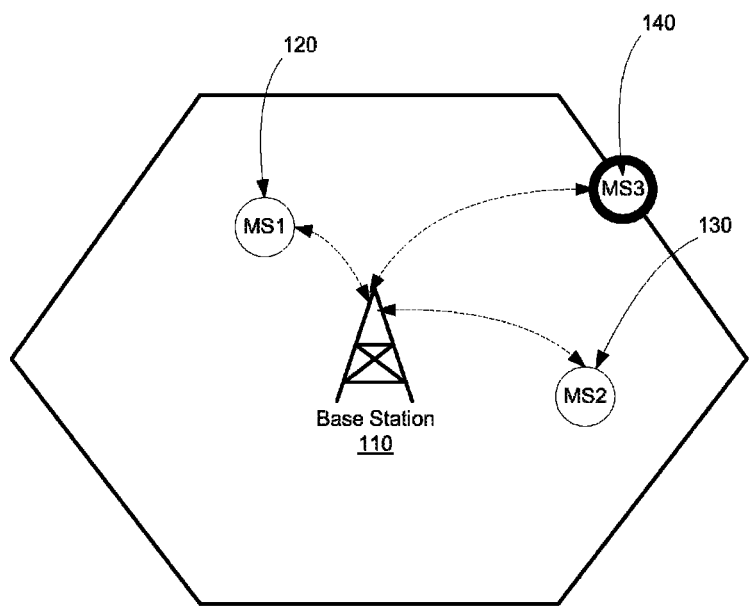
FIG. 1 shows a cell of a wireless system that includes a base station and mobile subscribers in which one of the mobile subscribers is subject to an uplink transmission condition.

Embodiments of systems, methods and apparatuses for improving the quality of uplink transmission of a mobile subscriber are disclosed. Embodiment include identifying that the mobile subscriber is subject to FIG. 1 shows a cell of a wireless system that includes a base station 110 and mobile subscribers 120, 130, 140 in which one of the mobile subscribers 140 is subject to an uplink transmission condition. More specifically, as shown, the mobile subscriber is located at an edge of the cell. Typically, mobile subscribers located at cell edges have uplink transmission path losses that are the greatest, and can additionally suffer from interference from neighboring cells.

An uplink condition can be generally defined as a condition in which an available transmission power of the mobile station is not sufficient to meet a desired Quality of Service (QoS) at the base station. The uplink transmission condition can be due to one or more of many different factors. For example, the mobile subscriber may be limited by a power rating of a power amplifier of the mobile subscriber. Alternatively or additionally, the mobile subscriber may be limited by uplink transmission path loss, uplink interference, uplink signal to noise ratio (SNR), or by uplink transmit power spectral density.

If an uplink conditions is detected, the mobile subscriber can adapt to this condition by using the described embodiments for enhancing the uplink transmission. More specifically, the mobile subscriber transmits a message over multiple uplink frames. In order for the base station to adapt, the mobile subscriber informs the base station that it is transmitting the message over the multiple uplink frames.

In addition to transmitting the message over multiple uplink frames, the mobile unit can transmit the message over different sets of sub-carriers for at least two of the multiple uplink frames. For embodiments of the mobile subscriber that include multiple antennas, the mobile subscriber can introduce a cyclic delay between the antennas, wherein the cyclic delay varies between at least two of the multiple uplink frames. Additionally, or alternatively, the mobile subscriber can toggle between the antennas for at least two of the multiple uplink frames.

The messages transmitted by the mobile subscriber include encoded bits. For an embodiment, transmitting the message over multiple uplink frames includes transmitting a same message over multiple uplink frames. For another embodiment, transmitting a message over multiple uplink frames includes transmitting different subsets of the message over the multiple uplink frames. For a more specific embodiment, each subset of the message occupies a minimum time/frequency allocation as determined by a wireless system protocol (several to be described).

Figure 2:
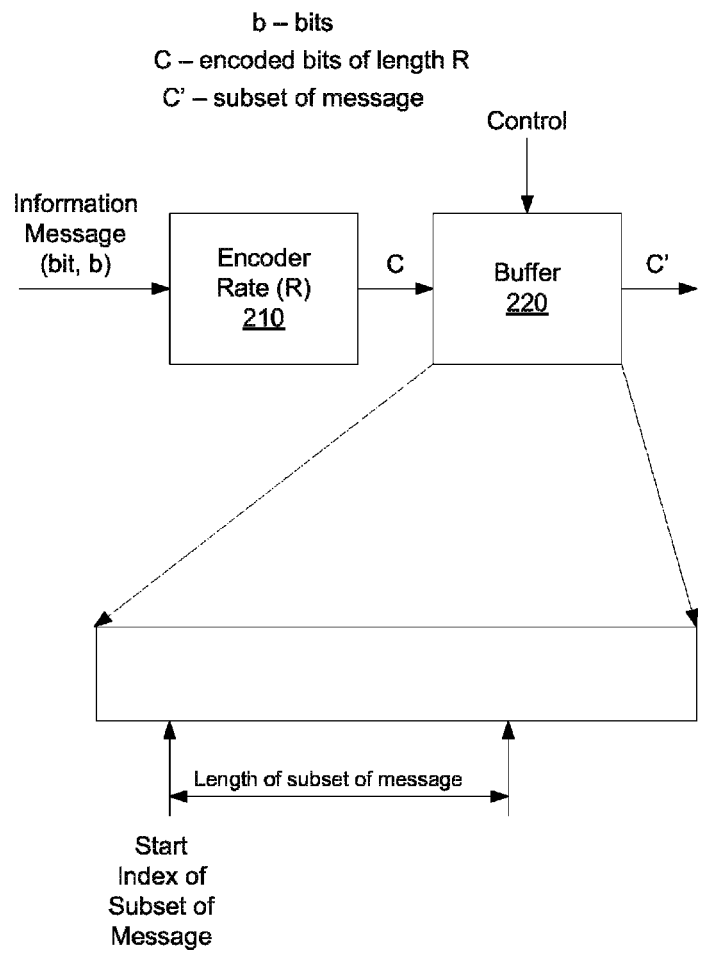
FIG. 2 shows an example of a portion of a transmit chain of a mobile subscriber for generating a message for uplink transmission.

FIG. 2 shows an example of a portion of a transmit chain of a mobile subscriber for generating a message (or a subset of a message) for uplink transmission. An encoder 210 receives information message bits of length B, which are encoded at a rate (R). The encoder 210 generates encoded bits of length C=B×1/R, shown as C. A buffer 220 is controlled by a controller, and generates subset of the message as determined by a start index and a length.

Figure 3:
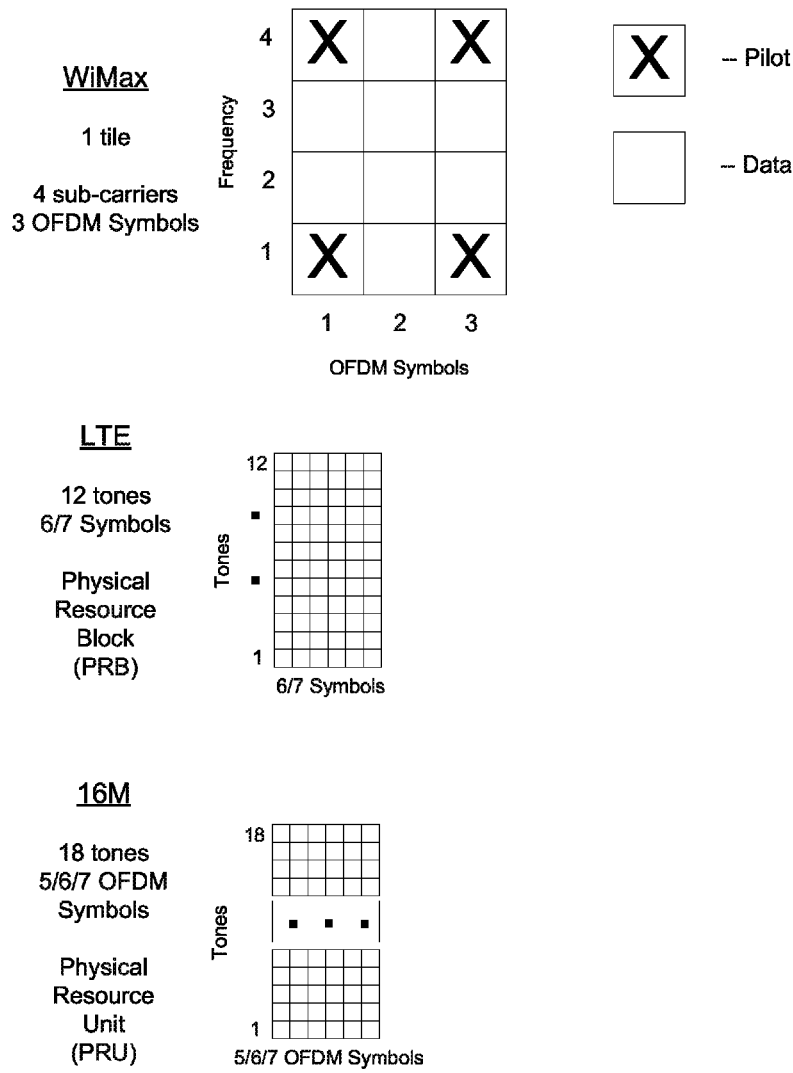
FIG. 3 shows examples of minimum time/frequency allocations for several different wireless system network standards.

FIG. 3 shows examples of minimum time/frequency allocations for several different wireless system network standards. A WiMAX (Worldwide Interoperability for Microwave Access) tile includes 4 sub-carriers amongst 3 OFDM (Orthogonal Frequency Division Multiplexed) symbols. An LTE (Long Term Evolution) physical resource block (PRB) includes 12 tones across 6-7 symbols. An IEEE (Institute of Electrical and Electronic Engineers) 802.16M physical resource unit (PRU) includes 18 tones spread across 5, 6 or 7 OFDM symbols.

Figure 4:
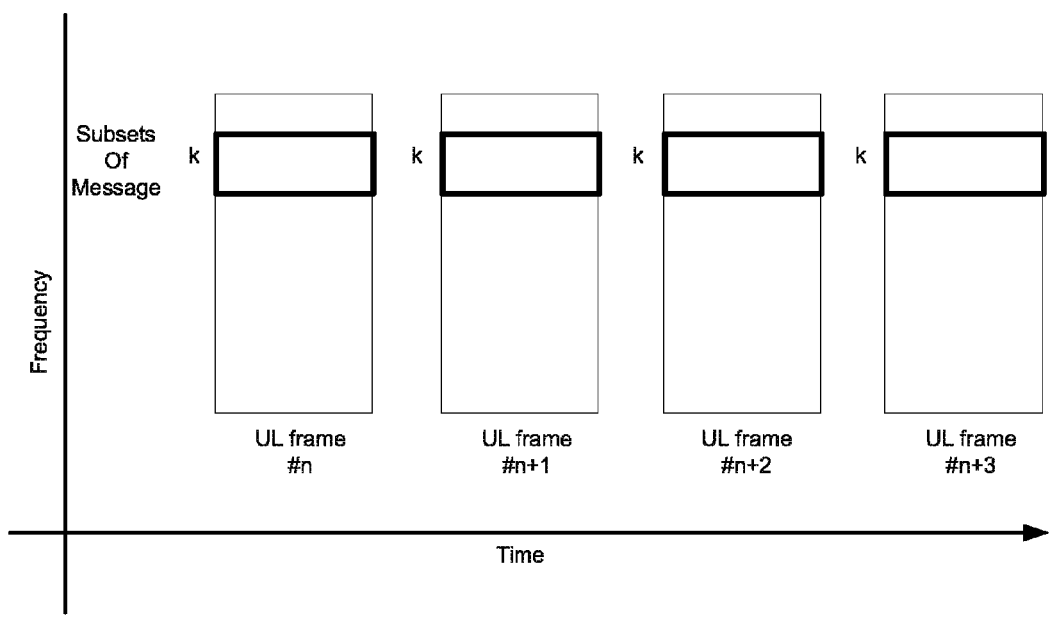
FIG. 4 shows an example of a message being uplink transmitted across several uplink frames.

FIG. 4 shows an example of a message being uplink transmitted across several uplink frames. As shown, a subset of the message is transmitted across the multiple uplink frames n, n+1, n+2, n+3 over, for example, a set of sub-carriers (k). Diversity (time) is provided by spreading the uplink transmission of the message over multiple uplink frames.

Figure 5:
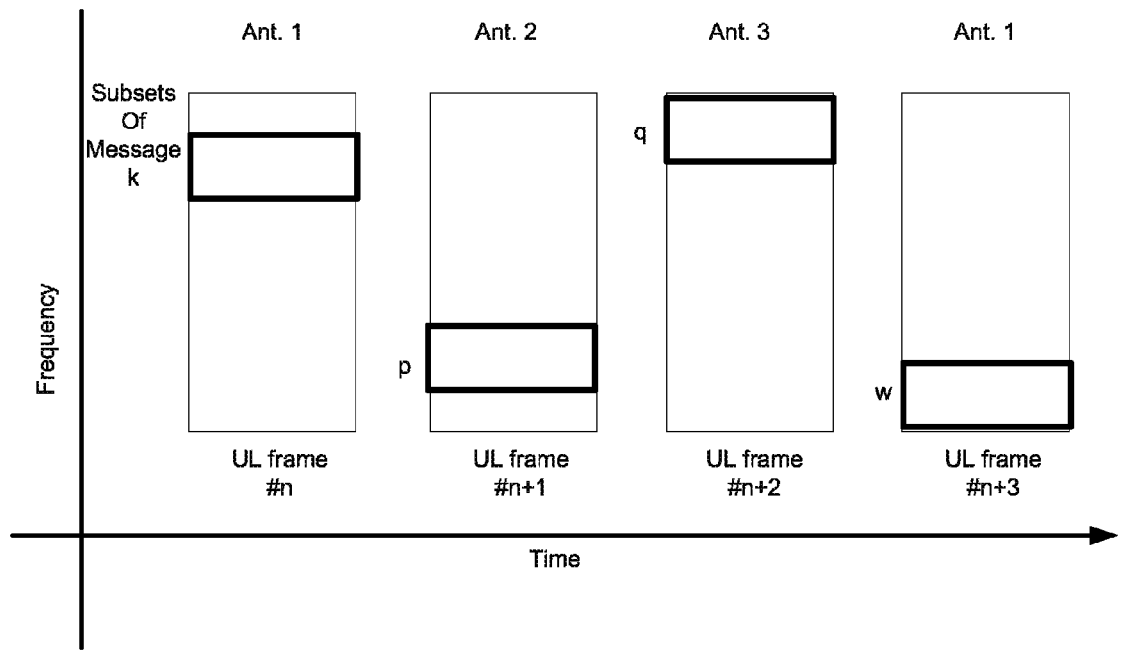
FIG. 5 shows an example of a message being uplink transmitted across several uplink frames, and at different frequencies.

FIG. 5 shows an example of a message being uplink transmitted across several uplink frames, and at different frequencies. Additionally diversity (frequency) is provided by varying the allocated frequency range of the subset of the message for each of the uplink frames n, n+1, n+2, n+3. That is, the subset being transmitted over the uplink frame #n occupy the set of k sub-carriers of the uplink frame. The subset being transmitted over the uplink frame #n+1 occupy the set of p sub-carriers of the uplink frame. The subset being transmitted over the uplink frame #n+2 occupy the set of q sub-carriers of the uplink frame. The subset being transmitted over the uplink frame #n+3 occupy the set of w sub-carriers of the uplink frame.

Additional diversity (spatial) can be realized by transmitting the different uplink frames over different antennas of the subscriber. For example, FIG. 5 shows the uplink frame #n being transmitted over a first antenna (Ant. 1), the uplink frame #n+1 being transmitted over the second antenna (Ant. 2), the uplink frame #n+2 being transmitted over the third antenna (Ant. 3), the uplink frame #n+3 being transmitted over the first antenna (Ant. 1).

Figure 6:
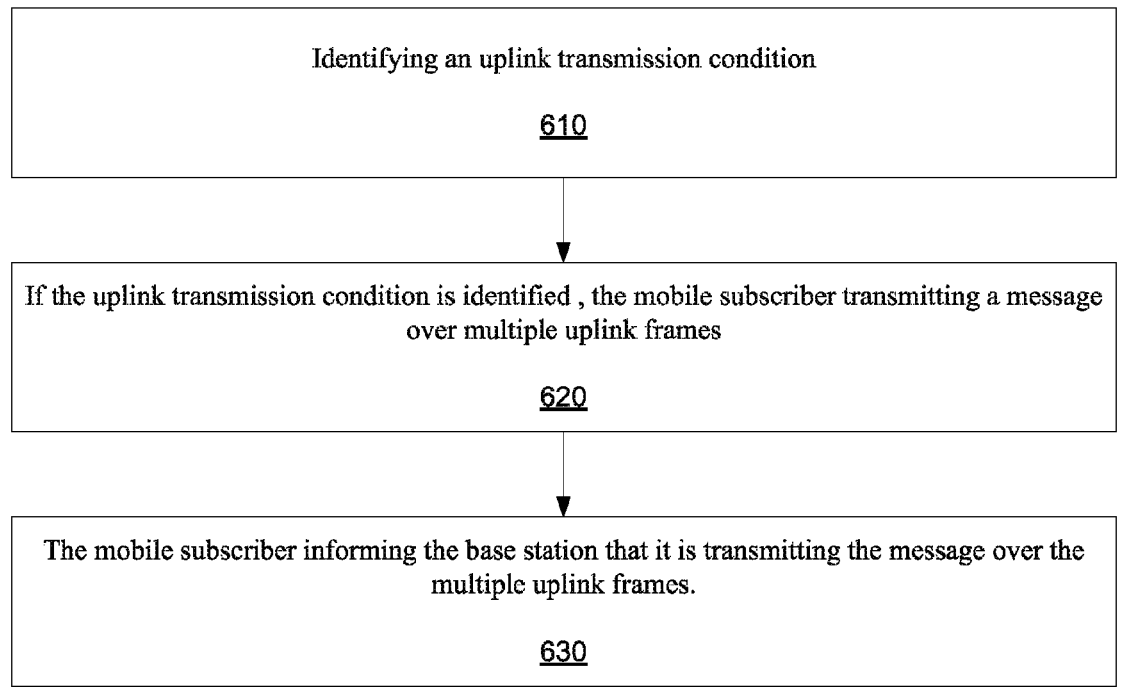
FIG. 6 is a flow chart that includes steps of an example of a method of a mobile subscriber transmitting information to a base station.

FIG. 6 is a flow chart that includes steps of an example of a method of a mobile subscriber transmitting information to a base station. A first step 610 includes identifying an uplink transmission condition. A second step 620 includes if the uplink transmission condition is identified, the mobile subscriber transmitting a message over multiple uplink frames. A third step 630 includes the mobile subscriber informing the base station that it is transmitting the message over the multiple uplink frames. For an embodiment, if the uplink transmission condition is identified, the mobile unit transmits the message over different sets of sub-carriers for at least two of the multiple uplink frames. The different sets of sub-carriers can be defined, for example, by logical sub-channels.

Various parameters can be used for identifying the uplink transmission condition. For an embodiment, the uplink transmission condition is identified by either the mobile or the base station identifying that an available transmission power of the mobile station is not sufficient to meet a desired Quality of Service (QoS) at the base station. For another embodiment, the uplink transmission condition is identified by either the mobile or the base station identifying that the mobile subscriber is proximate to a cell edge. More generally, embodiments of identifying the uplink transmission condition includes at least one of the mobile subscriber or the base station identifying the mobile subscriber being limited by a power rating of a power amplifier of the mobile subscriber, the mobile subscriber being limited by uplink transmission path loss, the mobile subscriber being limited by uplink interference, the mobile subscriber being limited by uplink signal to noise ratio (SNR), or the mobile subscriber being limited by uplink transmit power spectral density.

Generally, the message includes encoded bits. For an embodiment, transmitting the message over multiple uplink frames includes transmitting a same message over multiple uplink frames. For another embodiment, transmitting a message over multiple uplink frames includes transmitting different subsets of the message over the multiple uplink frames. For a more specific embodiment, each subset of the message occupies a minimum time/frequency allocation as determined by a wireless system protocol.

For an embodiment, the mobile subscriber includes multiple antennas. For a specific embodiment, the mobile subscriber introducing a cyclic delay between the antennas, wherein the cyclic delay varies between at least two of the multiple uplink frames. Cyclic Delay Diversity (CDD) is a diversity scheme used in OFDM (orthogonal frequency division modulation) based telecommunication systems, transforming spatial diversity into frequency diversity avoiding inter symbol interference. In telecommunications, a diversity scheme refers to a method for improving the reliability of a message signal by using two or more communication channels with different characteristics. Diversity plays an important role in combating fading and co-channel interference and avoiding error bursts. It is based on the fact that individual channels experience different levels of fading and interference.

For another specific embodiment, the mobile subscriber toggles between the antennas for at least two of the multiple uplink frames.

Figure 7:
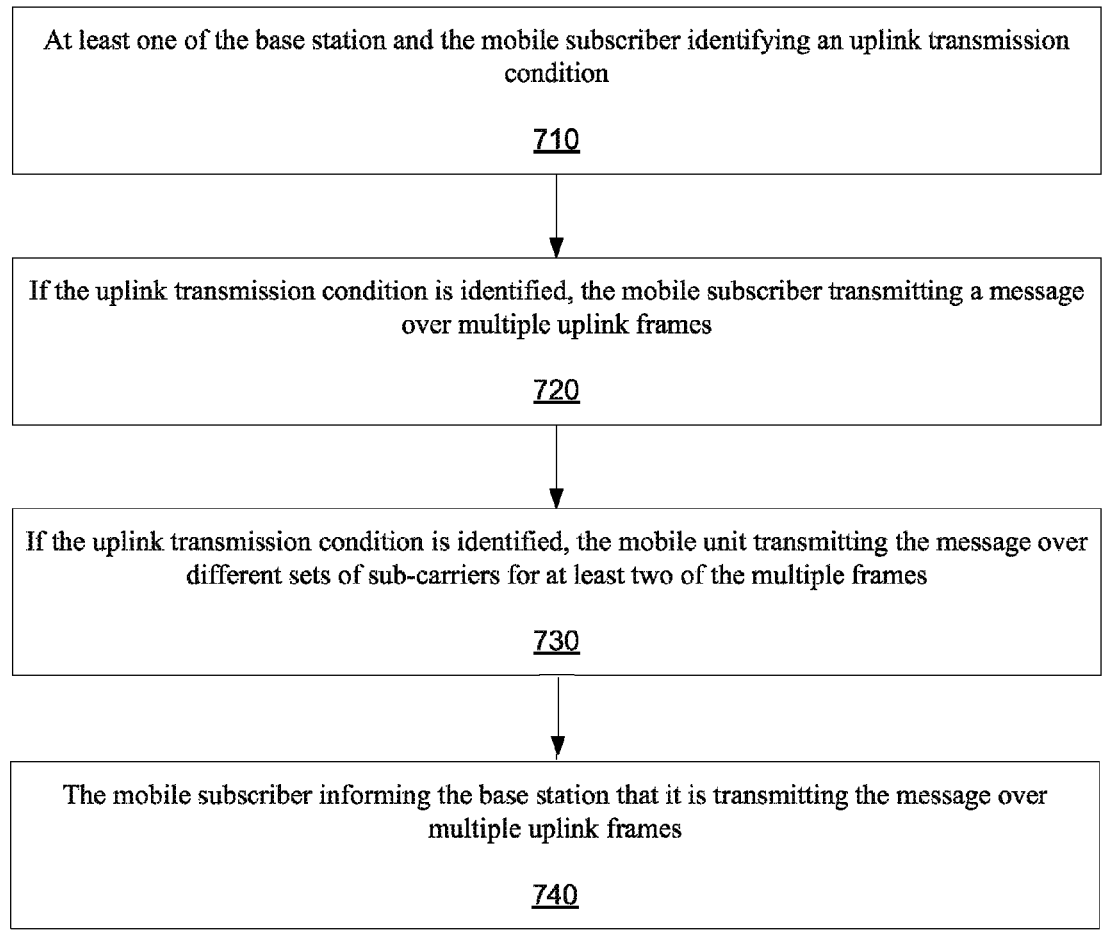
FIG. 7 is a flow chart that includes steps of an example of a method of a wireless system controlling uplink transmitting of information from a mobile station to a base station.

FIG. 7 is a flow chart that includes steps of an example of a method of a wireless system controlling uplink transmitting of information from a mobile station to a base station. A first step 710 includes at least one of the base station and the mobile subscriber identifying an uplink transmission condition. A second step 720 includes if the uplink transmission condition is identified, the mobile subscriber transmitting a message over multiple uplink frames. A third step 730 includes if the uplink transmission condition is identified, the mobile unit transmitting the message over different sets of sub-carriers for at least two of the multiple frames. A fourth step 740 includes the mobile subscriber informing the base station that it is transmitting the message over multiple uplink frames. Any number of the previously described parameters can be used for either the base station or the mobile subscriber identifying the uplink transmission condition.

For an embodiment, transmitting the message over multiple uplink frames includes transmitting different subsets of the message over the multiple uplink frame. An embodiment includes the base station controlling how the mobile station selects subsets of the message. For an embodiment, the base station schedules transmission of the subsets of the message. A more specific embodiment includes the base station scheduling the transmission of the subsets based on at least one of a receive power spectral density of uplink signals received at the base station and a size of the message to be scheduled.

For an embodiment, the base station receives the subsets of the message over the multiple frames and over the different subsets of carriers. For a specific embodiment, the base station transmits an acknowledgement (ACK) or a negative acknowledgement (NACK) after receiving a plurality of subsets of the message.

Figure 8:
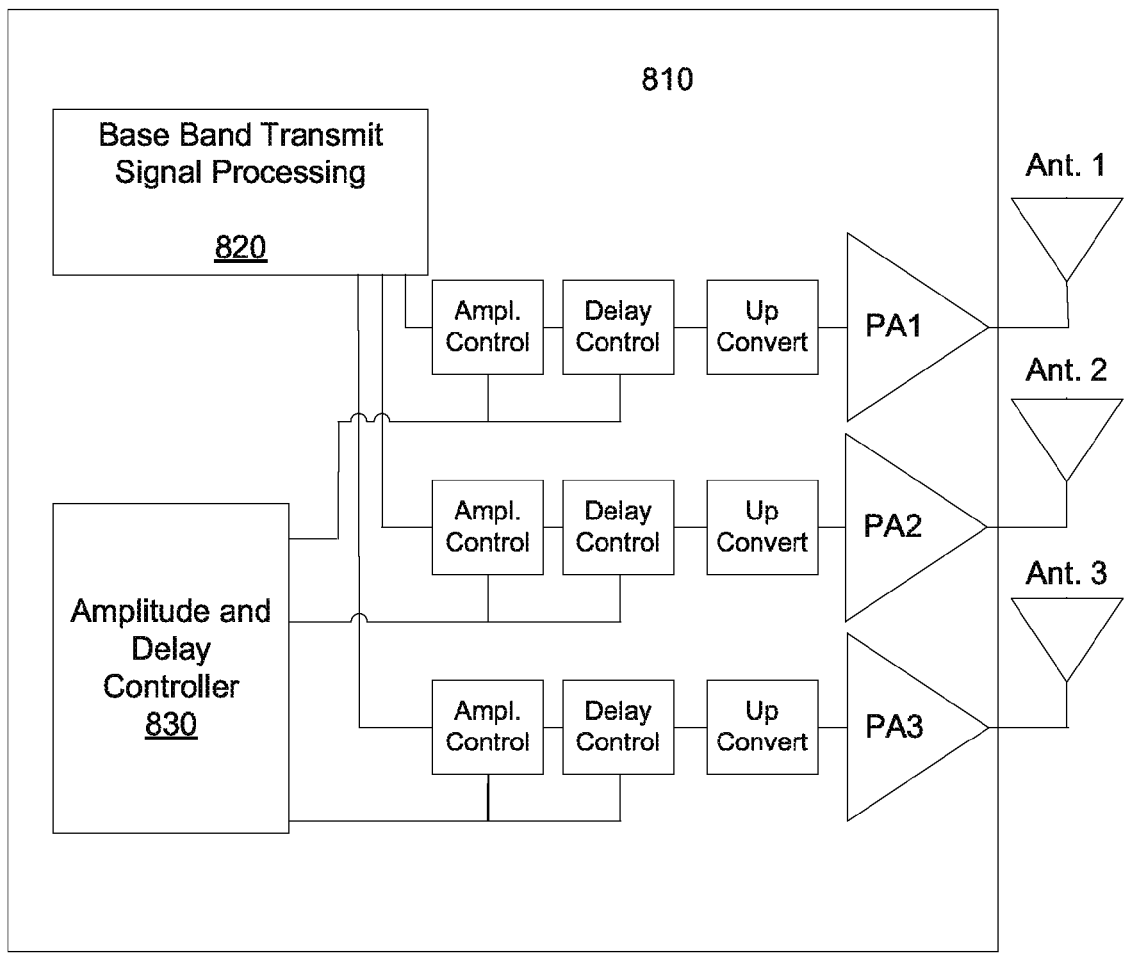
FIG. 8 is a block diagram of an example of a subscriber station that can utilize the described embodiments controlling uplink transmitting of information from a mobile station to a base station.

FIG. 8 is a block diagram of an example of a subscriber station that can utilize the described embodiments for controlling uplink transmission of information from a mobile station to a base station. The exemplary subscriber station 810 includes an amplitude and delay controller 830 and base band transmit signal processing 820. Based upon principles of the described embodiments, the controller 830 provides delay control of transmission signals of the subscriber station. Additionally, the controller 830 can provide amplitude control of transmission signals. Typically, the amplitude control is dependent upon the target transmission power level and the power ratings of the power amplifiers (PA1, PA2, PA3) of each of the antennas.

The order and magnitude of the delay associated with each of the antennas (Ant. 1, Ant. 2, Ant. 3) can be according to previously described embodiments. More specifically, the controller 830 can adjust the delay (for example, CDD) corresponding with each of the antennas (Ant. 1, Ant. 2, Ant. 3) at starting boundaries each of the transmitted uplink frames as shown, for example, in FIG. 5. As previously described, a mobile subscriber that includes multiple antennas, can introduce a cyclic delay between the antennas, wherein the cyclic delay varies between at least two of the multiple uplink frames.

Although specific embodiments have been described and illustrated, the embodiments are not to be limited to the specific forms or arrangements of parts so described and illustrated. The embodiments are limited only by the appended claims.

What is claimed:

1. A method of a mobile subscriber transmitting information to a base station, comprising:
    identifying, in the mobile subscriber, an uplink transmission condition;
    generating, in the mobile subscriber, a message that is to be transmitted over multiple uplink frames when the uplink transmission condition is identified;
    introducing a cyclic delay between a first antenna and a second antenna of the mobile subscriber, wherein the cyclic delay varies between at least two of the multiple uplink frames;
    transmitting, from the mobile subscriber to the base station, the message over multiple uplink frames; and
    informing, separately from the transmitting, the base station that the message is being transmitted over the multiple uplink frames.

2. The method of claim 1, wherein the transmitting comprises:
    transmitting the message over different sets of sub-carriers.

3. The method of claim 1, wherein the identifying comprises:
    identifying that an available transmission power of the mobile subscriber is insufficient to meet a desired Quality of Service (QoS) at the base station.

4. The method of claim 1, wherein the identifying comprises:
    identifying that the mobile subscriber is proximate to a cell edge.

5. The method of claim 1, wherein the identifying comprises:
    identifying that a mobile subscriber message transmission is limited by a power rating of a power amplifier of the mobile subscriber.

6. The method of claim 1, wherein the identifying comprises:
    identifying that a mobile subscriber message transmission is limited by uplink interference.

7. The method of claim 1, wherein the identifying comprises:
    identifying that a mobile subscriber message transmission is limited by an uplink signal to noise ratio (SNR).

8. The method of claim 1, further comprising:
    encoding the message.

9. The method of claim 1, wherein the transmitting comprises:
    transmitting different subsets of the message over different uplink frames.

10. The method of claim 9, further comprising:
    allocating a subset of the message to a minimum number of orthogonal frequency division multiple access (OFDM) symbols as determined by a wireless system protocol.

11. The method of claim 1, further comprising:
    assigning logical sub-channels to different sets of sub-carriers.

12. A mobile subscriber, comprising:
    means for identifying an uplink transmission condition;
    means for generating a message that is to be transmitted over multiple uplink frames when the uplink transmission condition is identified;
    means for transmitting the message over the multiple uplink frames;
    means for informing a base station that the message is being transmitted over the multiple uplink frames, the informing being separate from the transmitting the message;
    multiple antennas; and
    means for introducing a cyclic delay between the multiple antennas, the cyclic delay varying between at least two of the multiple uplink frames.

13. The mobile subscriber of claim 12, wherein the means for transmitting is configured to:
    transmit the message over different sets of sub-carriers for at least two of the multiple uplink frames.

14. The mobile subscriber of claim 12, wherein the means for identifying the uplink transmission condition is configured to:
identify that the mobile subscriber is limited by a power rating of a power amplifier of the mobile subscriber.

15. The mobile subscriber of claim 12, wherein the means for identifying the uplink transmission condition is configured to:
identify that the mobile subscriber is limited by uplink transmission path loss.

16. The mobile subscriber of claim 12, wherein the means for identifying the uplink transmission condition is configured to:
identify that the mobile subscriber is limited by uplink interference.

17. The mobile subscriber of claim 12, wherein the means for identifying the uplink transmission condition is configured to:
identify that the mobile subscriber is limited by an uplink signal to noise ratio (SNR).

18. The mobile subscriber of claim 12, wherein the means for transmitting is configured to:
transmit copies of the message over the multiple uplink frames.

19. The mobile subscriber of claim 12, wherein the means for transmitting is configured to:
transmit different subsets of the message over the multiple uplink frames.

20. The mobile subscriber of claim 12, further comprising:
means for toggling between the multiple antennas for at least two of the multiple uplink frames.

21. The method of claim 1, further comprising:
transmitting copies of the message over the multiple uplink frames.

\* \* \* \* \*

UNITED STATES PATENT AND TRADEMARK OFFICE
CERTIFICATE OF CORRECTION

PATENT NO.         : 8,867,459 B2                                                 Page 1 of 1
APPLICATION NO.    : 12/837400
DATED              : October 21, 2014
INVENTOR(S)        : Tujkovic et al.

It is certified that error appears in the above-identified patent and that said Letters Patent is hereby corrected as shown below:

In the Claims

Column 6, line 6, Claim 1, please replace "over multiple" with --over the multiple--.

Signed and Sealed this
Twelfth Day of May, 2015

Michelle K. Lee
*Director of the United States Patent and Trademark Office*